(12) United States Patent
Manivannan et al.

(10) Patent No.: US 7,056,451 B2
(45) Date of Patent: Jun. 6, 2006

(54) PHOSPHORS CONTAINING BORON AND RARE-EARTH METALS, AND LIGHT SOURCES INCORPORATING THE SAME

(75) Inventors: Venkatesan Manivannan, Rexford, NY (US); Alok Mani Srivastava, Niskayuna, NY (US); Holly Ann Comanzo, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 191 days.

(21) Appl. No.: 10/762,604

(22) Filed: Jan. 21, 2004

(65) Prior Publication Data

US 2005/0156503 A1 Jul. 21, 2005

(51) Int. Cl.
*C09K 11/77* (2006.01)
*C09K 11/63* (2006.01)

(52) U.S. Cl. .............. 252/301.4 R; 313/486; 313/487; 313/468; 313/639

(58) Field of Classification Search ............ None
See application file for complete search history.

(56) References Cited

U.S. PATENT DOCUMENTS

| | | | | |
|---|---|---|---|---|
| 4,319,161 A | * | 3/1982 | Looye et al. | 313/486 |
| 4,446,048 A | | 5/1984 | Ranby et al. | |
| 4,644,223 A | | 2/1987 | de Hair et al. | |
| 5,132,043 A | * | 7/1992 | Deboer | 252/301.4 R |

FOREIGN PATENT DOCUMENTS

EP  1073089  1/2001

OTHER PUBLICATIONS

Peters et al, "Unusual green emission from Mn2+ in Gd(BO2)3", Jour. of Luminescenece, 31 & 32 (1984), pp. 290-292.*
CN 1233642A (Changchun), Nov. 3, 1999.
JP56041292A (Kasei Optonix), Apr. 17, 1981.
"Phosphor Handbook", Shiego Shionoya et al. (ed), CRC Press, Boca Raton, Florida pp. 389-432 (1999).

* cited by examiner

*Primary Examiner*—C. Melissa Koslow
(74) *Attorney, Agent, or Firm*—Fletcher Yoder

(57) ABSTRACT

A phosphor comprises a material having a formula of $AB_3O_6$:Ce,Mn, wherein A is at least a rare-earth metal other than cerium. The phosphor can be used in light sources and displays.

24 Claims, 3 Drawing Sheets

PHOSPHORS CONTAINING BORON AND RARE-EARTH METALS, AND LIGHT SOURCES INCORPORATING THE SAME

BACKGROUND OF THE INVENTION

This invention relates photoluminescent materials (or phosphors) and lighting technology. In particular, this invention relates to phosphors containing borate of rare-earth metals, and to light sources incorporating such phosphors.

A phosphor is a luminescent material that absorbs radiation energy in a portion of the electromagnetic spectrum and emits energy in another portion of the electromagnetic spectrum. Phosphors of one important class are crystalline inorganic compounds of high chemical purity and of controlled composition to which small quantities of other elements (called "activators") have been added to convert them into efficient fluorescent materials. With the right combination of activators and inorganic compounds, the color of the emission can be controlled. Most useful and well-known phosphors emit radiation in the visible portion of the electromagnetic spectrum in response to excitation by electromagnetic radiation outside the visible range. Well-known phosphors have been used in mercury vapor discharge lamps to convert ultraviolet ("UV") radiation emitted by the excited mercury vapor to visible light. Other phosphors are capable of emitting visible light upon being excited by electrons (used in cathode ray tubes) or X rays (for example, scintillators in X-ray detection systems).

Fluorescent lamps having high luminous output and color rendering indices ("CRI"), which are based on mercury discharge and used for illumination, typically include three phosphors that convert UV radiation of the mercury discharge into relatively narrow bands of blue, green, and red visible light, concentrated in the spectral regions where the human eye has the highest sensitivity (450, 540, and 610 nm). Lanthanum phosphate co-activated with terbium and cerium ($LaPO_4:Tb^{3+},Ce^{3+}$) has been a favorite green light-emitting phosphor, having a large peak emission at about 543 nm. $Ce^{3+}$ ions act as an efficient sensitizer to $Tb^{3+}$ ions. Energy is transferred from $Ce^{3+}$ ions to $Tb^{3+}$ ions, thus giving an efficient emission under UV excitation. However, the UV output is still relatively high because the $Ce^{3+}$—$Ce^{3+}$ energy transfer is more than the $Ce3+$–$Tb^{3+}$ energy transfer. Such UV output tends to reduce the efficiency of this phosphor.

Therefore, there is till a need to provide more efficient green light-emitting phosphors. It is also very desirable to use such green light-emitting phosphors to produce light sources having high energy efficiency and high CRIs.

SUMMARY OF THE INVENTION

The present invention provides phosphors that comprise an oxide of: (a) boron; and (b) at least a rare-earth metal other than cerium, which oxide is co-activated with cerium and manganese.

According to one aspect of the present invention, the phosphor has a formula of $AB_3O_6:Ce,Mn$, wherein A is at least a rare-earth metal other than cerium. In this disclosure, the elements follow a colon denote the activators in the phosphor. Further chemical formulae are used to represent materials in such a way that, whenever more than two elements are included within a parenthesis, it implies that at least one of the elements need to be present in the material.

According to still another aspect of the present invention, each of the cerium and manganese activators is present in an amount from about 0.01 to about 30 mole percent of the total amount of A, cerium, and manganese.

According to another aspect, the present invention provides a method for making a phosphor that comprises an oxide of: (a) boron; (b) at least a rare-earth metal other than cerium; (c) cerium; and (d) manganese. The method comprises: (a) mixing oxygen-containing compounds of: (1) boron; (2) at least a rare-earth metal other than cerium; (3) cerium, and (4) manganese; and (b) firing the mixture in a reducing atmosphere at a temperature in a range from about 900° C. to about 1300° C. for a time sufficient to convert the mixture to the phosphor.

According to another aspect, a method for making a phosphor comprises: (a) providing a first solution that comprises compounds of: (1) boron; (2) at least a rare-earth metal other than cerium; (3) cerium, and (4) manganese; (b) combining the first solution and a second solution, the second solution comprising at least a compound selected from the group consisting of ammonium hydroxide; hydroxides of at least one element selected from the group consisting of cerium, manganese, said at least a rare-earth metal other than cerium; organic esters; organic dicarboxylic acids; and organic amines to produce a precipitate; (c) heating the precipitate in an oxygen-containing atmosphere at a temperature in a range from about 700° C. to about 1300° C. for a time sufficient to convert the precipitate to an oxygen-containing material that comprises boron, said at least a rare-earth metal other than cerium, cerium, and manganese; and (d) firing said oxygen-containing material in a reducing atmosphere at a temperature in a range from about 900° C. to about 1300° C. for a time sufficient to convert said oxygen-containing material to the phosphor.

According to still another aspect of the present invention, a method for making a phosphor comprises: (a) providing a first solution that comprises compounds of: (1) at least a rare-earth metal other than cerium; (2) cerium; and (3) manganese; (b) combining the first solution and a second solution, the second solution comprising at least a compound selected from the group consisting of ammonium hydroxide; hydroxides of at least one element selected from the group consisting of cerium, manganese, said at least a rare-earth metal other than cerium; organic dicarboxylic acids; and organic amines to produce a precipitate; (c) heating the precipitate in an oxygen-containing atmosphere at a temperature in a range from about 700° C. to about 1300° C. for a time sufficient to convert the precipitate to an oxygen-containing material that comprises cerium, manganese, and said at least a rare-earth metal other than cerium; (d) combining said oxygen-containing material with at least an oxygen-containing compound of boron to produce a mixture; and (e) firing said mixture in a reducing atmosphere at a temperature in a range from about 900° C. to about 1300° C. for a time sufficient to convert said mixture to the phosphor.

According to still another aspect, a visible light source comprises: (a) a source of UV radiation; and (b) a phosphor comprising an oxide of: (1) boron; (2) at least a rare-earth metal other than cerium; said phosphor being co-activated with cerium and manganese; wherein the phosphor absorbs at least a portion of the UV radiation and emits visible light.

Other features and advantages of the present invention will be apparent from a perusal of the following detailed description of the invention and the accompanying drawings in which the same numerals refer to like elements.

Figure 1:
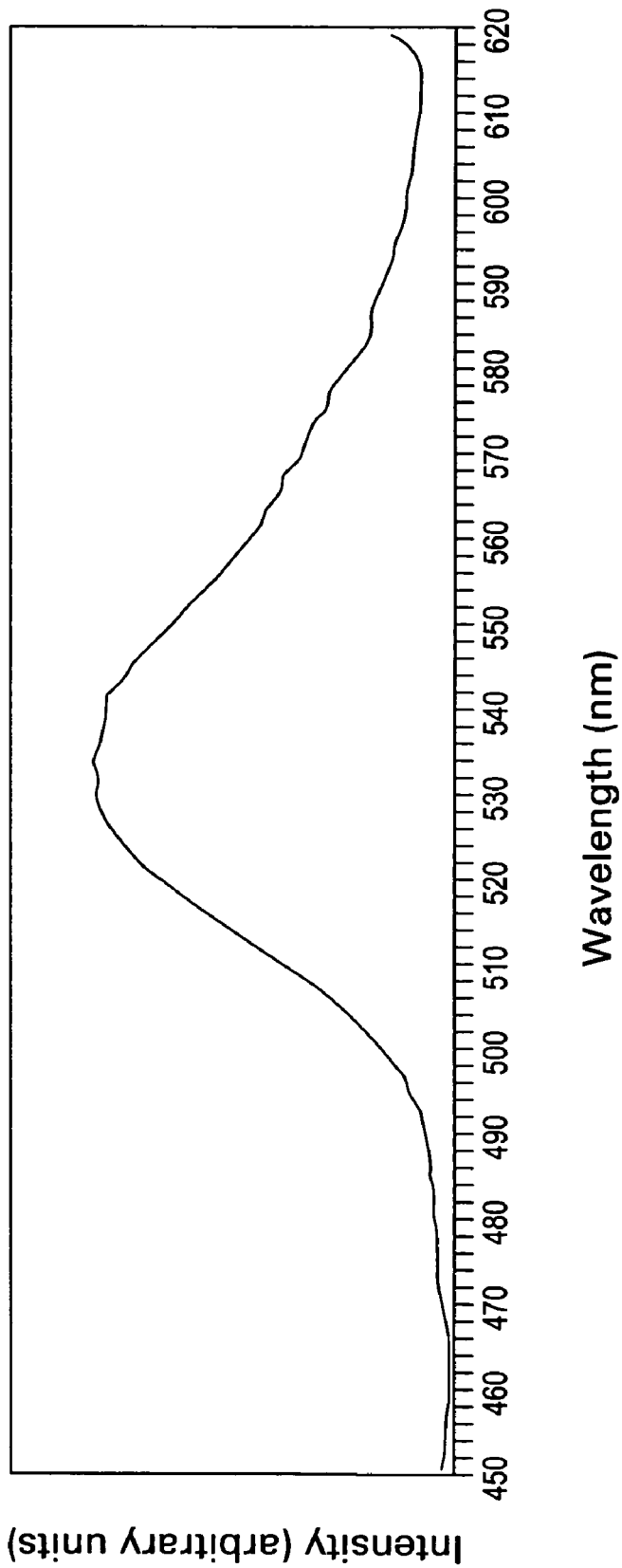
FIG. 1 shows the emission spectrum of $Gd_{0.97}B_3O_6$:Ce, Mn phosphor of the present invention.
Figure 2:
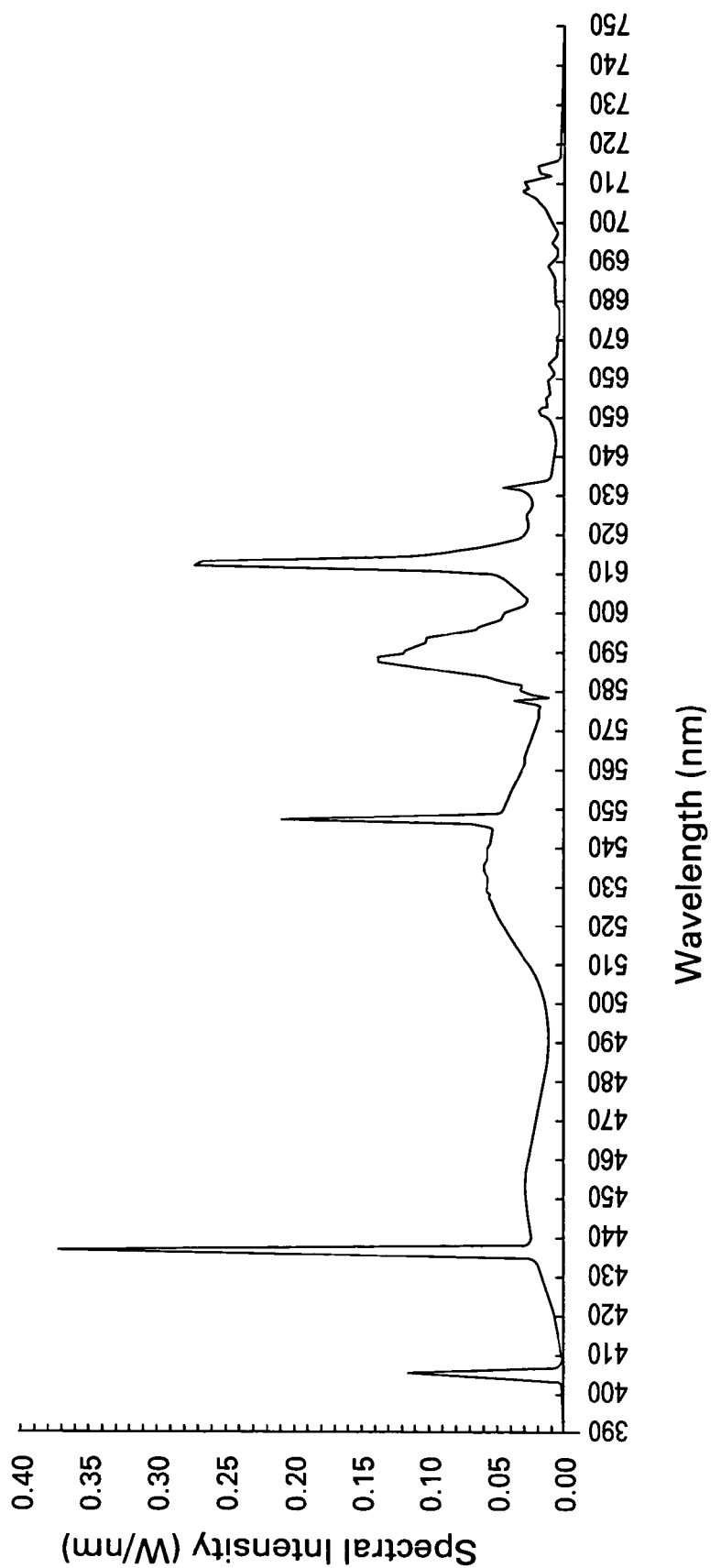
FIG. 2 shows the spectral power distribution of a phosphor blend consisting of $Gd_{0.97}B_3O_6$:Ce,Mn; $(Ba,Sr,Ca)MgAl_{10}O_{17}$:$Eu^{2+}$; $(Y,In)BO_3$:$Eu^{3+}$; and $Y_2O_3$:$Eu^{3+}$.

It should be understood that the drawings are included only for illustration purposes, are not intended to limit the invention in any way, and are not drawn to scale.

DETAILED DESCRIPTION OF THE INVENTION

In general, the present invention provides phosphors that comprise oxide of: (a) boron; and (b) at least a rare-earth metal other than cerium; which oxide is co-activated with cerium and manganese. The phosphors of the present invention are excitable by radiation in the UV range (i.e., having wavelengths in the range from about 200 nm to about 400 nm) to emit substantially in visible light wavelengths from about 500 nm to about 600 nm.

According to one aspect of the present invention, the phosphor has a formula of $AB_3O_6$:Ce,Mn, wherein A is at least a rare-earth metal other than cerium.

In one embodiment, A is at least one rare earth metal selected from the group consisting of gadolinium, scandium, yttrium, lanthanum, samarium, terbium, lutetium, and combinations thereof.

In another embodiment, A is a combination of gadolinium and yttrium.

In still another embodiment, A is gadolinium.

In still another embodiment of the present invention, each of the cerium and manganese activators is present in an amount from about 0.01 to about 30 mole percent, preferably from about 0.1 to about 10 mole percent, more preferably from about 0.1 to about 5 mole percent, of the total amount of A, cerium, and manganese.

In general, a phosphor of the present invention may be represented by a formula of $(A_{1-x-y}Ce_xMn_z)B_3O_6$; wherein x, y, z are positive numbers less than 1; $0<1-x-y<1$; $(2/3)z \leq y \leq z$. It should be recognized that when $(2/3)z<y \leq z$, the phosphor has certain defects, such as point defects, in its crystal structure.

The present invention also provides methods for making a phosphor that comprises an oxide of: (a) boron; and (b) at least a rare-earth metal other than cerium. The phosphor is co-activated with cerium and manganese. A phosphor of the present invention can be produced by a dry method or a wet method. The dry method comprises: (a) mixing oxygen-containing compounds of: (1) boron; (2) at least a rare-earth metal other than cerium; (3) cerium; and (4) manganese to form a mixture; and (b) firing the mixture in a reducing atmosphere at a temperature in a range from about 900 C to about 1300 C for a time sufficient to convert the mixture to the phosphor.

In one aspect of the method of the present invention, said at least a rare-earth metal other than cerium is selected from the group consisting of scandium, yttrium, lanthanum, samarium, terbium, lutetium, and combinations thereof.

The oxygen-containing compounds may be mixed together by any mechanical method including, but not limited to, stirring or blending in a high-speed blender or a ribbon blender. The oxygen-containing compounds may be combined and pulverized together in a bowl mill, a hammer mill, or a jet mill. The mixing may be carried out by wet milling especially when the mixture of the oxygen-containing compounds is to be made into a solution for subsequent precipitation. If the mixture is wet, it may be dried first before being fired to a temperature in the range from about 900° C. to about 1300° C. The drying may be carried out at ambient atmosphere or under a vacuum. The firing may be conducted in a batchwise or continuous process, preferably with a stirring or mixing action to promote good gas-solid contact. A firing time in a range from about 1 minute to about 10 hours is adequate. It should be noted that the firing time can depend on the amount of material being treated to produce the phosphor, or on the extent of contact between the solid and the gas of the atmosphere, or on the degree of mixing while the mixture is fired or heated. Preferably, the temperature is in the range from about 900° C. to about 1200° C.

The mixture can be rapidly brought to and held at the final temperature. Alternatively, the mixture may be heated up to the final temperature at a lower rate, such as from about 10° C./minute to about 200° C./minute, preferably from about 10° C./minute to about 100° C./minute.

The reducing atmosphere comprises a reducing gas, such as hydrogen, carbon monoxide, ammonia, hydrazine, or a mixture of one of these compounds with an inert gas selected from the group consisting of nitrogen, helium, argon, krypton, xenon, and combinations thereof. A preferred reducing gas is a mixture of hydrogen and nitrogen containing hydrogen in an amount from about 0.5 volume percent to about 10 volume percent. Alternatively, the reducing gas mixture is generated by a reaction between the residual oxygen in the reactor or firing chamber and carbon particles packed therein to scavenge this residual oxygen.

In a preferred embodiment, the mixture of starting materials for producing the phosphor also comprises a flux, such as boric acid, lithium tetraborate, lithium carbonate, hydrogen borate, alkali hydroborate, or a mixture thereof.

According to another aspect of the present invention, the flux may comprise at least a halide compound of cerium, manganese, or said rare-earth metals other than cerium. In one embodiment, the halide compound is a fluoride. The halide compound acts as a flux during the firing step and can comprise up to about 10 percent by weight of the mixture.

The oxygen-containing compounds of cerium, manganese, and said at least a rare-earth metal other than cerium may be selected from the group consisting of oxides, carbonates, nitrates, sulfates, phosphates, citrates, carboxylates (salts of carboxylic acids), and combinations thereof. Lower carboxylates (e.g., having from one to five carbon atoms, inclusive), such as acetates, may be desirable.

Non-limiting examples of oxygen-containing compounds of boron are ammonium hydrogen borate trihydrate; boric acid; and alkali (such as sodium or potassium) tetraborate tetrahydrate, pentahydrate, or decahydrate. When an alkali borate is used, it may be desired to wash the phosphor after the step of firing to remove any soluble alkali compounds from the phosphor.

According to another aspect, a method for making a phosphor comprises: (a) providing a first solution that comprises compounds of: (1) boron; (2) at least a rare-earth metal other than cerium; (3) cerium; and (4) manganese; (b) combining the first solution and a second solution, the second solution comprising at least a compound selected from the group consisting of ammonium hydroxide; hydroxides of at least one element selected from the group consisting of cerium, manganese, and said rare-earth metals other than cerium; organic esters; organic dicarboxylic acids; and organic amines to produce a precipitate; (c) heating the precipitate in an oxygen-containing atmosphere at a temperature in a range from about 700° C. to about 1300° C. for a time sufficient to convert the precipitate to an oxygen-containing material that comprises boron, cerium, manganese, and said at least a rare-earth metal other than cerium; and (d) firing said oxygen-containing material in a reducing atmosphere at a temperature in a range from about 900° C. to about 1300° C. for a time sufficient to convert said oxygen-containing material to the phosphor.

In one embodiment, the first solution is simply an aqueous solution if the compounds of boron, cerium, manganese, and said at least a rare-earth metal other than cerium are readily dissolved in water.

In another embodiment, oxides or other oxygen-containing compounds of boron, cerium, manganese, and said at least a rare-earth metal other than cerium are dissolved in an acidic solution to form the first solution, such as hydrochloric acid, nitric acid, sulfuric acid, citric acid, or acetic acid. The strength of the acid solution is chosen to rapidly dissolve the oxides or the oxygen-containing compounds, and the choice is within the skill of a person skilled in the art. The second solution (e.g., ammonium hydroxide) is then added in increments to the first solution while stirring to precipitate a mixture of oxygen-containing compounds of said first element, said second element, cerium, and terbium. An organic base; such as methanolamine, ethanolamine, propanolamine, dimethanolamine, diethanolamine, dipropanolamine, trimethanolamine, triethanolamine, or tripropanolamine; may be used in place of ammonium hydroxide. Alternatively, an ester of an organic acid may be used to carry out the precipitation; such as methyl, ethyl, or propyl esters of acetic acid, propionic acid, butyric acid, oxalic acid, malonic acid, succinic acid, or glutaric acid; dimethyl, diethyl, dipropyl esters of oxalic acid, malonic acid, succinic acid, or glutaric acid. Alternatively, an organic acid selected from the group consisting of oxalic acid, malonic acid, succinic acid, and glutaric acid, may be used to produce the precipitate. The precipitate is filtered, washed with deionized water, and optionally dried. The dried precipitate is ball milled or otherwise thoroughly blended and then fired in said reducing atmosphere at 1000° C. a temperature in the range from about 900° C. to about 1300° C., preferably from about to about 1200° C. Alternatively, the wet precipitate can be heated or fired first, and then ball milled or otherwise thoroughly blended afterward.

In one embodiment of the method of the present invention a flux is included in the first solution. A flux is selected from the group disclosed above in conjunction with the dry method.

The oxygen-containing atmosphere for the heating step (c) can be air; oxygen; a mixture of oxygen and an inert gas selected from the group consisting of nitrogen, helium, argon, krypton, xenon, and combinations thereof; $NO_x$; or $SO_x$. The oxygen-containing atmosphere can comprise a gas that decomposes to give an oxygen-containing compound at the heating temperature. The heating time for step (c) is in the range from about 1 minute to about 10 hours.

The reducing atmosphere comprises a reducing gas selected from the group consisting of hydrogen, carbon monoxide, ammonia, hydrazine, and mixtures of one of these compounds with an inert gas selected from the group consisting of nitrogen, helium, argon, krypton, xenon, and combinations thereof. A preferred reducing gas is a mixture of hydrogen and nitrogen containing hydrogen in an amount from about 0.5 volume percent to about 10 volume percent. A firing time in a range from about 1 minute to about 10 hours is adequate. It should be noted that the firing time can depend on the amount of material being treated to produce the phosphor, or on the extent of contact between the solid and the gas of the atmosphere, or on the degree of mixing while the mixture is fired.

According to still another aspect of the present invention, a method for making a phosphor comprises: (a) providing a first solution that comprises compounds of: (1) at least a rare-earth metal other than cerium; (2) cerium, and (3) manganese; (b) combining the first solution and a second solution, the second solution comprising at least a compound selected from the group consisting of ammonium hydroxide; hydroxides of at least one element selected from the group consisting of cerium, manganese, and said at least a rare-earth metal other than cerium; organic esters; organic dicarboxylic acids; phosphoric acid; and organic amines to produce a precipitate; (c) heating the precipitate in an oxygen-containing atmosphere at a temperature in a range from about 700° C. to about 1300° C. for a time sufficient to convert the precipitate to an oxygen-containing material that comprises cerium, manganese, and said at least a rare-earth metal other than cerium; (d) combining said oxygen-containing material with at least an oxygen-containing compound of boron to form a mixture; and (e) firing said mixture in a reducing atmosphere at a temperature in a range from about 900° C. to about 1300° C. for a time sufficient to convert said oxygen-containing material to the phosphor.

In one embodiment, the first solution is simply an aqueous solution if the compounds of cerium, manganese, and said at least a rare-earth metal other than cerium are readily dissolved in water.

In another embodiment, oxides or other oxygen-containing compounds of cerium, manganese, and said at least a rare-earth metal other than cerium are dissolved in an acidic solution to form the first solution, such as hydrochloric acid, nitric acid, sulfuric acid, citric acid, or acetic acid. The strength of the acid solution is chosen to rapidly dissolve the oxides or the oxygen-containing compounds, and the choice is within the skill of a person skilled in the art. The second solution (e.g., ammonium hydroxide) is then added in increments to the first solution while stirring to precipitate a mixture of oxygen-containing compounds of cerium, manganese, and said at least a rare-earth metal other than cerium. An organic base; such as methanolamine, ethanolamine, propanolamine, dimethanolamine, diethanolamine, dipropanolamine, trimethanolamine, triethanolamine, or tripropanolamine; may be used in place of ammonium hydroxide. Alternatively, an ester of an organic acid may be used to carry out the precipitation; such as methyl, ethyl, or propyl esters of acetic acid, propionic acid, butyric acid, oxalic acid, malonic acid, succinic acid, or glutaric acid; dimethyl, diethyl, dipropyl esters of oxalic acid, malonic acid, succinic acid, or glutaric acid. Alternatively, an organic acid selected from the group consisting of oxalic acid, malonic acid, succinic acid, and glutaric acid, may be used in the second solution to produce the precipitate. The precipitate is filtered, washed with deionized water, and optionally dried. The dried precipitate may be ball milled or otherwise thoroughly blended before being combined with oxygen-containing compounds of phosphorus and/or boron, and then fired in said reducing atmosphere at a temperature in the range from about 900° C. to about 1300° C., preferably from about 1000° C. to about 1200° C.

Non-limiting examples of oxygen-containing compounds of boron are ammonium hydrogen borate trihydrate; alkali (such as sodium or potassium) hydroborate; boric acid; and alkali (such as sodium or potassium) tetraborate tetrahydrate, pentahydrate, or decahydrate. When an alkali borate is used, it may be desired to wash the phosphor after the step of firing to remove any soluble alkali compounds from the phosphor.

In one embodiment of the method of the present invention a flux is included in the first solution. A flux is selected from the group disclosed above in conjunction with the dry method.

EXAMPLE

Manufacture of $Gd_{0.97}Ce_{0.015}Mn_{0.015}B_3O_6$ Phosphor

Quantities of $Gd_2O_3$, $MnCO_3$, and $CeO_2$, which were chosen to obtain the final desired formula, were dry blended thoroughly to produce a mixture. The mixture was then fired at 1040° C. for a total time of about 6 hours in a reducing atmosphere comprising hydrogen (1 volume percent) in nitrogen. The fired material was re-blended, and then re-fired at the same conditions. After firing, the resulting material was milled to a mean particle size of about 6 micrometers. The phosphor has a composition of $(Gd_{0.97}Ce_{0.015}Mn_{0.015})B_3O_6$ and emits green visible light, an emission spectrum of which is shown in FIG. 1.

Other phosphors of the present invention can be prepared by the same dry method or by the wet method disclosed above.

In addition, a portion of gadolinium may be desirably substituted with at least one rare earth metal other than gadolinium and cerium. For example, gadolinium can be partially substituted with at least an element selected from the group consisting of Sc, Y, La, Tb, Lu, and combinations thereof.

A phosphor of the present invention can be blended with other phosphors that emit blue, green, and red light to provide white light. For example, the borate phosphor of the Example can be blended with $(Ba,Sr,Ca)MgAl_{10}O_{17}:Eu^{2+}$; $(Y,In)BO_3:Eu^{3+}$; and $Y_2O_3:Eu^{3+}$ phosphors such that the contributions of each individual phosphor to the combined spectral power are 36.9, 44.4, 29.9, and 18.7, respectively. This simulated combination is shown to provide a color rendering index ("CRI") of 79, a radiant output of 83.5 lumens per watt, and a correlated temperature of 4000 K. This phosphor blend is projected to have a one-percent improvement in energy efficiency over a blend wherein LaPO4:Ce, Tb, replaces the borate phosphor.

White Light-Emitting Device

Incorporation of a blend of phosphors that comprises a green light-emitting phosphor of the present invention (as has been disclosed herein above), a red light-emitting phosphor, and a blue light-emitting phosphor in a mercury discharge device provides a white light-emitting device that have a higher efficiency than prior-art devices because a green light-emitting phosphor of the present invention absorbs more efficiently UV radiation emitted by the mercury discharge.

Another green light-emitting phosphor may be used in addition to a phosphor of the present invention, if desired. Non-limiting examples of such other green light-emitting phosphors are $GdMgB_5O_{10}:Ce^{3+},Tb^{3+}$; $CeMgAl_{11}O_{19}:Ce^{3+}$, $Tb^{3+}$; $Ca_5(PO_4)_3(Cl,F,OH):Sb^{3+},Mn^{2+},Eu^{2+}$; $Sr_4Al_{14}O_{25}:Eu^{2+}$; and $BaAl_8O_{13}:Eu^{2+}$; and combinations thereof.

Non-limiting examples of blue light-emitting phosphors are $(Ba,Sr,Ca)_5(PO_4)_3(Cl,F,OH):Eu^{2+}$; $(Ba,Sr,Ca)MgAl_{10}O_{17}:Eu^{2+}$; $(Ba,Sr,Ca)BPO_5:Eu^{2+}$; and combinations thereof.

Non-limiting examples of red light-emitting phosphors are $(Y,Gd,La,Lu,Sc)_2O_3:Eu^{3+}$; $(Y,Gd,La,In,Lu,Sc)BO_3:Eu^{3+}$; $(Y,Gd,La)(Al,Ga)O_3:Eu^{3+}$; $(Ba,Sr,Ca)(Y,Gd,La,Lu)_2O_4:Eu^{3+}$; $(Y,Gd)Al_3B_4O_{12}:Eu^{3+}$; monoclinic $Gd_2O_3:Eu^{3+}$; $(Gd,Y)_4(Al,Ga)_2O_9:Eu^{3+}$; $(Ca,Sr)(Gd,Y)_3(Ge,Si)AlO_9:Eu^{3+}$; $(Sr,Mg)_3(PO_4)_2:Sn^{2+}$; $GdMgB_5O_{10}:Ce^{3+},Mn^{2+}$; and $3.5MgO.0.5MgF_2.GeO_2:Mn^{4+}$.

Green light-emitting phosphors of the present invention emit light having a peak emission in the range from about 530 nm to about 550 nm, to which the human eye is most sensitive. Blue light-emitting phosphors used in a phosphor blend of the present invention preferably emit light having a peak emission in the range from about 420 nm to about 500 nm. Red light-emitting phosphors preferably emit light having a peak emission in the wavelength range from about 600 nm to about 620 nm.

Figure 3:
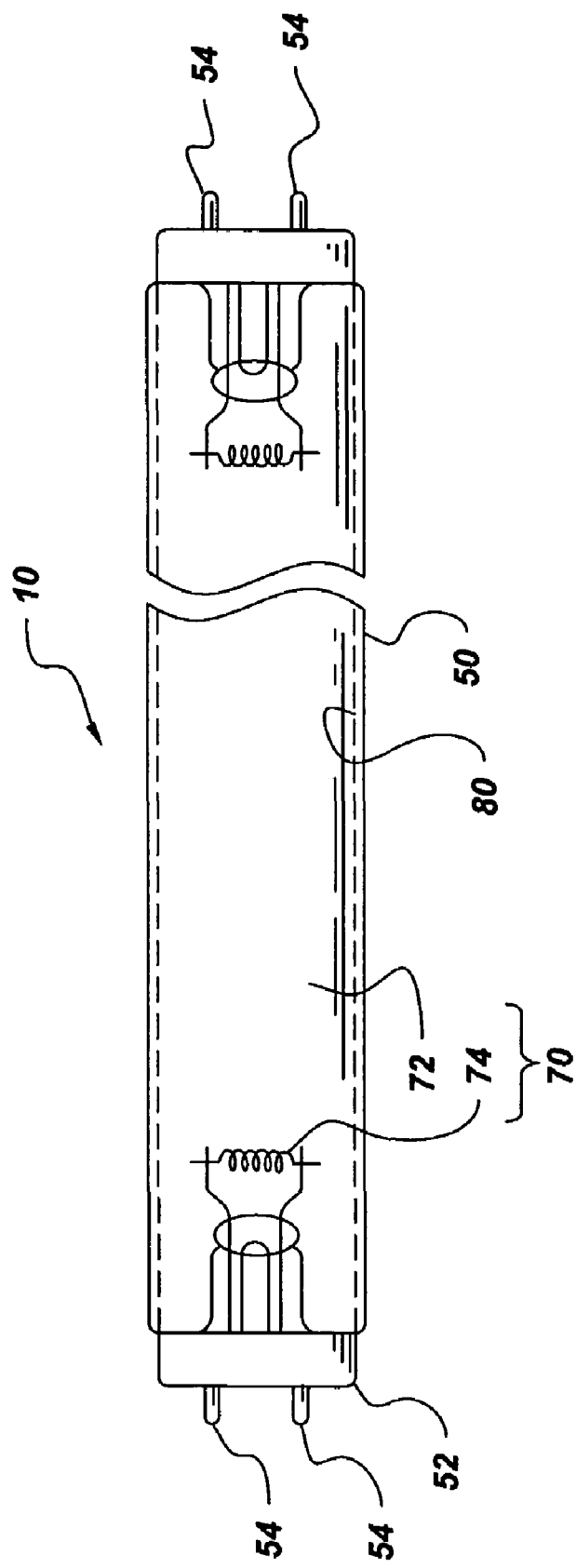
FIG. 3 shows schematically a light source that incorporates a phosphor of the present invention.

In one embodiment of the present invention, a light source 10, which produces white light with a high CRI suitable for general illumination (e.g., CRI in the range from about 80 to about 100), is shown in FIG. 3. Light source 10 comprises an evacuated sealed housing 50, a means 70 for generating UV radiation, which means is located within housing 50, and a phosphor blend 80 located within housing 50 and adapted to be excited by UV radiation. In one embodiment, light source 10 is a fluorescent lamp and evacuated housing 50 comprises an evacuated glass tube and associated end caps 52. In another embodiment, the phosphor blend is disposed on an inner surface of housing 50. Means 70 for generating UV radiation is a combination of a gas comprising a means 74 for generating high-energy electrons and a means 72 for absorbing the energy of the high-energy electrons. In one embodiment, means 72 for absorbing energy of high-energy electrons is a gas comprising mercury vapor, which absorbs energy of the high-energy electrons to create a mercury vapor discharge to excite the phosphor. In addition to mercury vapor, the gas can comprise an inert gas such as argon, krypton, or xenon. Means 74 for generating high-energy electrons may be a filament of a metal having a low work function (such as less than 4.5 eV), such as tungsten, or such a filament coated with alkaline earth metal oxides as are known in the art. Pins 54 are provided to supply electrical power to electron-generating means 74. The filament is coupled to a high-voltage source to generate electrons from the surface thereof. A phosphor of the present invention may be used in combination with other conventional phosphors used in fluorescent lighting technology. For example, a phosphor of the present invention may be combined with conventional red, green, and blue light-emitting phosphors, which conventional phosphor are disclosed herein above, to produce white light from a mercury discharge lamp. A particulate material comprising $TiO_2$ and/or $Al_2O_3$ can be used in conjunction with the phosphor blend to scatter light generated by light source 10. Such a light scattering material can be blended into the phosphor blend or disposed as a layer between the inner surface of housing 50 and phosphor layer 80. Although light source 10 shown in FIG. 3 comprises a straight housing 50, it should be understood that other housing shapes also are applicable. For example, a compact fluorescent lamp can have a housing that has one or more bends, and electrical supply pins 54 are disposed at one end of light source 10.

A green light-emitting phosphor of the present invention also can be used as a component of a phosphor blend for displays, such as cathode-ray tubes, which phosphor blend comprises blue light-emitting and green light-emitting phosphors. In this case, the high-energy electrons bombard a screen on which a coating of the phosphor blend is disposed to emit light in the visible spectral region.

While specific preferred embodiments of the present invention have been described in the foregoing, it will be appreciated by those skilled in the art that many modifications, substitutions, or variations may be made thereto without departing from the spirit and scope of the invention as defined in the appended claims.

What is claimed is:

1. A phosphor comprising a material having a formula of $AB_3O_6$:Ce,Mn, wherein A is at least a combination of gadolinium and yttrium.

2. The phosphor according to claim 1, wherein A further includes materials selected from the group consisting of, scandium, lanthanum, samarium, terbium, lutetium, and combinations thereof.

3. The phosphor according to claim 1, wherein each of cerium and manganese is present in said phosphor in an amount from about 0.01 to about 30 mole percent of a total amount of A, cerium, and manganese.

4. The phosphor according to claim 1, wherein each of cerium and manganese is present in said phosphor in an amount from about 0.1 to about 10 mole percent of a total amount of A, cerium, and manganese.

5. The phosphor according to claim 1, wherein each of cerium and manganese is present in said phosphor in an amount from about 0.1 to about 5 mole percent of a total amount of A, cerium, and manganese.

6. A phosphor blend comprising a material having a formula of $(Gd_{1-x-y}Ce_xMn_z)B_3O_6$; wherein $0<x, y, z<1$; $0<1-x-y<1$; and $(2/3)z \leq y \leq z$.

7. A phosphor blend comprising: (a) a phosphor having a formula of $AB_3O_6$:Ce,Mn, wherein A is at least a rare-earth metal other than cerium; (b) a red light-emitting phosphor; and (c) a blue light-emitting phosphor.

8. The phosphor blend according to claim 7, wherein the phosphor blend further comprises a green light-emitting phosphor.

9. A phosphor blend comprising: (a) a phosphor having a formula of $AB_3O_6$:Ce,Mn, wherein A is at least a rare-earth metal other than cerium; (b) $(Ba,Sr,Ca)MgAl_{10}O_{17}$:$Eu^{2+}$; (c) $(Y,In)BO_3$:$Eu^{3+}$; and (d) $Y_2O_3$:$Eu^{3+}$.

10. The phosphor blend according to claim 9, wherein the phosphor of (a) has a formula of $(Gd_{0.97}Ce_{0.015}Mn_{0.015})B_3O_6$.

11. A method for making a phosphor, the method comprising:
(a) mixing oxygen-containing compounds of: (1) boron; (2) at least a rare-earth metal other than cerium; (3) cerium; and (4) manganese to form a mixture; and
(b) firing the mixture in a reducing atmosphere at a temperature in a range from about 900° C. to about 1300° C. for a time sufficient to convert the mixture to a phosphor, wherein the phosphor comprises a material having a formula of $AB_3O_6$:Ce,Mn, wherein A is at least a rare-earth metal other than cerium.

12. The method according to claim 11; wherein said at least a rare-earth metal other than cerium is selected form the group consisting of gadolinium, scandium, yttrium, lanthanum, samarium, terbium, lutetium, and combinations thereof.

13. The method according to claim 11, wherein the mixture further comprises at least a material selected from the group consisting of lithium tetraborate, lithium carbonate, hydrogen borate, alkali hydroborate, and mixtures thereof.

14. A method for making a phosphor, the method comprising:
(a) providing a first solution that comprises compounds of: (1) boron; (2) at least a rare-earth metal other than cerium; (3) cerium, and (4) manganese;
(b) combining the first solution and a second solution, the second solution comprising at least a compound selected from the group consisting of ammonium hydroxide; hydroxides of at least one element selected from the group consisting of cerium, manganese, and said at least a rare-earth metal other than cerium; organic esters; organic dicarboxylic acids; phosphoric acid; and organic amines to produce a precipitate;
(c) heating the precipitate in an oxygen-containing atmosphere at a temperature in a range from about 700° C. to about 1300° C. for a time sufficient to convert the precipitate to an oxygen-containing material that comprises said cerium, manganese, and said at least a rare-earth metal other than cerium; and
(d) firing said oxygen-containing material in a reducing atmosphere at a temperature in a range from about 900° C. to about 1300° C. for a time sufficient to convert said oxygen-containing material to a phosphor, wherein the phosphor comprises a material having a formula of $AB_3O_6$:Ce,Mn, wherein A is at least a rare-earth metal other than cerium.

15. The method according to claim 14; wherein said at least a rare-earth metal other than cerium is selected form the group consisting of gadolinium, scandium, yttrium, lanthanum, samarium, terbium, lutetium, and combinations thereof.

16. A method for making a phosphor, said method comprising:
(a) providing a first solution that comprises compounds of: (1) at least a rare-earth metal other than cerium; (2) cerium, and (3) manganese;
(b) combining the first solution and a second solution, the second solution comprising at least a compound selected from the group consisting of ammonium hydroxide; hydroxides of cerium, manganese, and said at least a rare-earth metal other than cerium; organic esters; organic dicarboxylic acids; phosphoric acid; and organic amines to produce a precipitate;
(c) heating the precipitate in an oxygen-containing atmosphere at a temperature in a range from about 700° C. to about 1300° C. for a time sufficient to convert the precipitate to an oxygen-containing material that comprises said at least a rare-earth metal other than cerium, cerium, and manganese;
(d) combining said oxygen-containing material with at least an oxygen-containing compound of boron to form a mixture; and
(e) firing said mixture in a reducing atmosphere at a temperature in a range from about 900° C. to about 1300° C. for a time sufficient to convert said oxygen-containing material to a phosphor, wherein the phosphor comprises a material having a formula of $AB_3O_6$:Ce,Mn, wherein A is at least a rare-earth metal other than cerium.

17. The method according to claim 16; wherein said at least a rare-earth metal other than cerium is selected form the group consisting of gadolinium, scandium, yttrium, lanthanum, samarium, terbium, lutetium, and combinations thereof.

18. A light source comprising:
(a) a source of UV radiation that is located in a sealed housing; and (b) a phosphor disposed within the sealed housing and adapted to be excited by the UV radiation and to emit visible light, wherein the phosphor comprises a material having a formula of $AB_3O_6$:Ce,Mn, wherein A is at least a rare-earth metal other than cerium.

19. The light source according to claim 18, wherein said at least a rare-earth metal other than cerium is selected form the group consisting of gadolinium, scandium, yttrium, lanthanum, samarium, terbium, lutetium, and combinations thereof.

20. The light source according to claim 18, wherein said at least a rare-earth metal other than cerium is a combination of gadolinium and yttrium.

21. The light source according to claim 18, wherein said at least a rare-earth metal other than cerium is gadolinium.

22. The light source according to claim 18, wherein the source of UV radiation is a mercury gas discharge.

23. A display comprising:
(a) a source of radiation that is located in a sealed housing, said radiation comprising high-energy electrons; and
(b) a phosphor disposed within the sealed housing and adapted to be excited by the radiation and to emit visible light, wherein the phosphor comprises a material having a formula of $AB_3O_6$:Ce,Mn, wherein A is at least a rare-earth metal other than cerium.

24. A phosphor comprising a material having a formula of $AB_3O_6$:Ce,Mn, wherein A is at least a rare-earth metal other than cerium and gadolinium.

* * * * *